United States Patent
Wulf et al.

(10) Patent No.: US 10,294,814 B2
(45) Date of Patent: May 21, 2019

(54) ELLIPSOIDAL INNER CENTRAL BLADE STORAGE SPACE

(71) Applicant: MTU Aero Engines AG, Munich (DE)

(72) Inventors: Joachim Wulf, Munich (DE); Philipp Langholf, Unterschleissheim (DE); Manuel Hein, Karlsfeld (DE)

(73) Assignee: MTU Aero Engines AG, Munich (DE)

(*) Notice: Subject to any disclaimer, the term of this patent is extended or adjusted under 35 U.S.C. 154(b) by 45 days.

(21) Appl. No.: 15/793,785

(22) Filed: Oct. 25, 2017

(65) Prior Publication Data

US 2018/0119567 A1   May 3, 2018

(30) Foreign Application Priority Data

Oct. 26, 2016   (EP) .................................. 16195816

(51) Int. Cl.
*F01D 17/16*   (2006.01)
*F01D 9/04*   (2006.01)
*F02B 37/24*   (2006.01)
*F04D 29/56*   (2006.01)

(52) U.S. Cl.
CPC ........... *F01D 17/162* (2013.01); *F01D 9/042* (2013.01); *F02B 37/24* (2013.01); *F04D 29/56* (2013.01); *F04D 29/563* (2013.01); *F05D 2220/32* (2013.01); *F05D 2240/12* (2013.01); *F05D 2250/24* (2013.01); *Y02T 10/144* (2013.01); *Y02T 50/673* (2013.01)

(58) Field of Classification Search
CPC ........ F01D 17/16; F01D 17/162; F01D 9/042; F02B 37/24; F04D 29/56; F04D 29/563; F05D 2220/32; F05D 2240/12; F05D 2250/24; Y02T 10/144; Y02T 50/673
See application file for complete search history.

(56) References Cited

U.S. PATENT DOCUMENTS

| | | | |
|---|---|---|---|
| 3,910,716 A | 10/1975 | Roughgarden et al. | |
| 4,013,377 A | 3/1977 | Amos | |
| 4,076,451 A | 2/1978 | Jankot | |
| 2013/0216361 A1 | 8/2013 | Propheter-Hinckley | |
| 2017/0268356 A1* | 9/2017 | Stiehler .................. | F01D 9/041 |

FOREIGN PATENT DOCUMENTS

| | | |
|---|---|---|
| EP | 0696675 A1 | 2/1996 |
| EP | 2884055 A1 | 12/2014 |
| EP | 2955335 A1 | 3/2015 |
| EP | 3032037 A1 | 10/2015 |

* cited by examiner

*Primary Examiner* — Hieu T Vo
(74) *Attorney, Agent, or Firm* — Barlow, Josephs & Holmes, Ltd.

(57) ABSTRACT

An inner ring according to the invention or an inner ring segment according to the invention for an adjustable guide vane assembly comprises a plurality of uptakes, each for the bearing of an adjustable guide vane. The uptakes here each form an essentially ellipsoidally shaped uptake space for a guide vane head of the respective guide vane. A guide vane according to the invention for an adjustable guide vane assembly has a blade body and a guide vane head. The guide vane head is essentially ellipsoidal in shape and is equipped to be accommodated pivotably in an uptake of an inner ring or inner ring segment of the guide vane assembly.

11 Claims, 3 Drawing Sheets

ELLIPSOIDAL INNER CENTRAL BLADE STORAGE SPACE

BACKGROUND OF THE INVENTION

Figure 1:
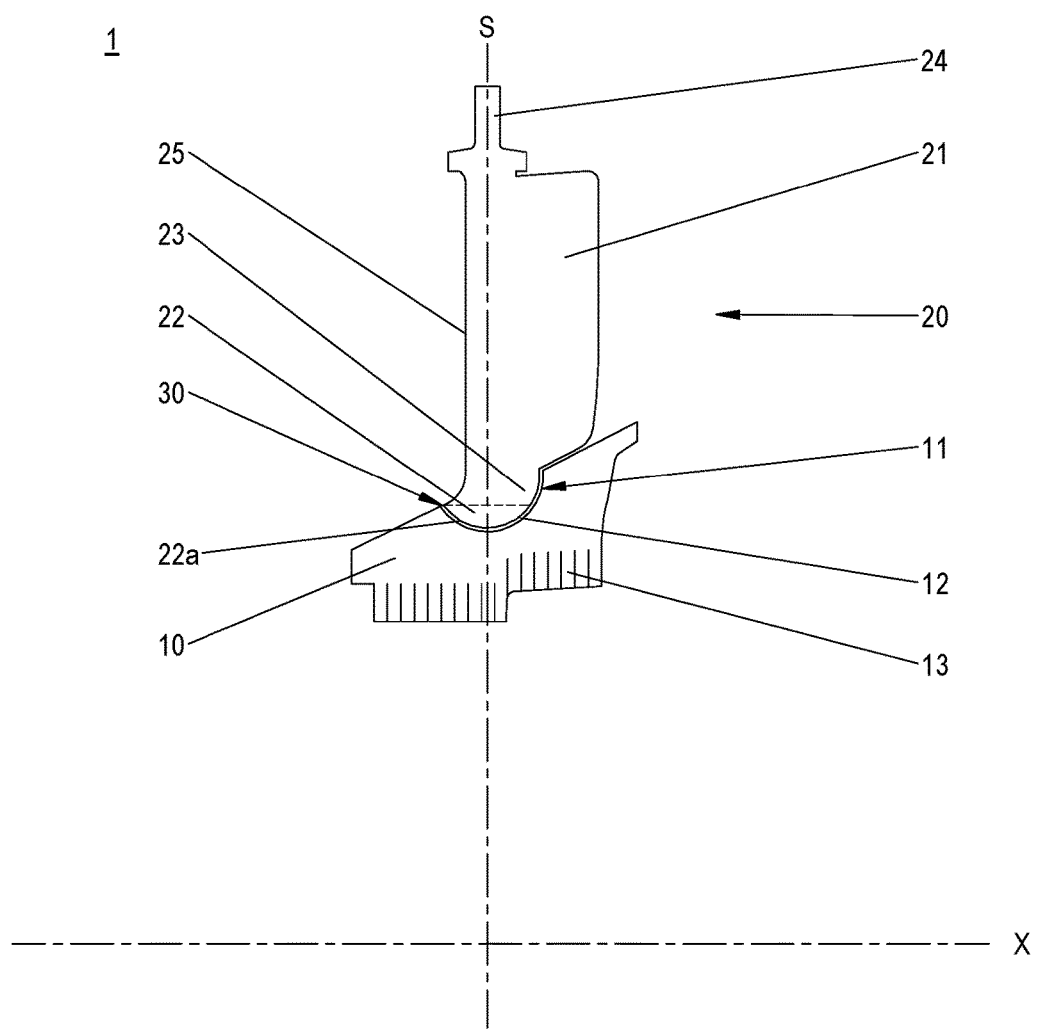

The studies that led to this invention were funded under Grant Agreement No. CSJU-GAM-SAGE-2008-001 as part of the European Union's Seventh Framework Program (FP7/2007-2013) for the Clean Sky Joint Technology Initiative.

The present invention relates to an inner ring for an adjustable guide vane assembly, an inner ring segment for such an inner ring, a guide vane, a guide vane assembly, and a turbomachine.

Turbomachines, such as aircraft engines and stationary gas turbines, often have at least one guide vane assembly for adjustment of optimal operating conditions. Said guide vane assembly comprises an inner ring and a plurality of guide vanes, one end of each of which is arranged at the inner ring and which extend radially outward from it; the terms "radially," "axially," and "in the peripheral direction" always refer in this document—unless otherwise stated—to a central geometric axis of the guide vane assembly or of the inner ring and, for better readability, this is not always especially formulated.

Such a guide vane assembly can be designed, in particular, to be adjustable. In this case, the guide vanes can pivot around a provided pivot axis, which, in general, coincides with the longitudinal axis of the guide vanes and is directed essentially radially.

The pivoting can occur via outer adjusting components at the guide vanes, in particular by means of adjusting pins, which are inserted into or will be inserted into associated uptakes of the housing and which can then interact with a corresponding adjusting device at the outer housing.

An inner stabilization of the guide vanes often occurs in known guide vane assemblies via bearing pins, which extend radially inward from a respective guide vane plate and which can be guided in bearing bushings of the inner ring.

Especially in the case of relatively small turbomachines, it is possible in the case of a guide vane assembly concept that provides for guide vanes with guide vane plates and bearing pins, normally to provide only relatively few guide vanes on account of the small installation space. In addition, the associated inner rings have a relatively large radial thickness, which, for a given housing diameter, results in correspondingly short guide vanes and thus a small aerodynamic effective surface. Because the efficiency of the guide vane assembly is limited for these reasons, efforts have been made, in particular for small compressors, to provide other bearing arrangement possibilities for guide vanes. Moreover, a fundamental concern in the design of guide vane assemblies is to minimize leakage flows, which occur in the region of the bearing arrangement and can considerably impair the efficiency of the respective turbomachine. In particular, a resulting renewed inflow can lead to a disruption of the main gas flow and thus lead to flow losses. Such a leakage can be promoted, for example, by gaps that are formed in uptakes and/or in bushings for the bearing pins owing to wear.

Known from EP 2 955 335 A1 is an adjustable guide vane assembly for use in a geometrically small compressor. The guide vanes of the guide vane assembly are hereby mounted directly via their radially inner blade plates in the inner ring.

In EP 2 884 055 A1, for minimization of the installation space, on the one hand, and of leakage flows, on the other hand, an inner ring in which guide vanes are mounted is proposed, for which at least one of the guide vanes has a slip surface radially arranged inside, which is formed essentially perpendicular to the radially directed longitudinal axis of the guide vane. In particular, the radially inner end of the guide vane can have the form of a truncated cone.

SUMMARY OF THE INVENTION

The object of the present invention is to provide an alternative technology for the radially inner bearing arrangement of guide vanes, which, in particular, is suitable for relatively small turbomachines. An additional object of the invention is to make possible a simple intermeshing of guide vanes in uptakes of an inner ring, wherein a bearing arrangement region of the guide vanes rests as closely as possible against an uptake wall.

The objects are achieved by an inner ring according to claim 1, an inner ring segment according to claim 5, a guide vane according to claim 6, a guide vane assembly according to claim 9, and a turbomachine according to claim 10. Advantageous embodiments are disclosed in the dependent claims, the description, and the figures.

An inner ring in accordance with the invention for an adjustable guide vane assembly comprises (at its radially outer surface) a plurality of uptakes, each for the bearing of an adjustable (that is, pivotable) guide vane. The uptakes each form an essentially ellipsoidally shaped uptake space, that is, an uptake space bounded by a part of an ellipsoid surface, for a guide vane head of a respective guide vane (that is, for an end portion of the guide vane that is to be positioned radially inward); in this case the ellipsoidal uptake space can be only a part of the inner volume of the respective uptake. A wall of the uptake space is thus directed in the section along the surface of an (abstract) ellipsoid. In particular, the uptake space can thus have the shape of an ellipsoid segment (that is, a part of an ellipsoid that is formed from its intersection with a plane). In accordance with a special advantageous exemplary embodiment, the ellipsoid is a sphere and the uptake space is therefore essentially spherical; that is, it has the shape of a spherical segment.

A guide vane in accordance with the invention for an adjustable guide vane assembly has (in particular) a vane body and a guide vane head (that is, an end portion that is to be positioned radially inward). The guide vane head is hereby equipped so as to be accommodated pivotably in an uptake of an inner ring, so that, therefore, the guide vane can be mounted in the inner ring by means of the guide vane head. The guide vane head is hereby essentially ellipsoidal in shape; that is, it has a surface region that coincides with a part of the surface of an ellipsoid. In particular, the guide vane head can have the shape of an ellipsoid segment. In accordance with a special advantageous exemplary embodiment, the ellipsoid is a sphere and the guide vane head is therefore essentially designed to be spherical, that is, for example, as a spherical segment. Preferably, the guide vane head forms the entire portion of the guide vane that is equipped to be lowered into an uptake of an inner ring.

An inner ring according to the invention and a guide vane according to the invention each make possible a robust, compact, and low-wear inner guide vane bearing arrangement for an adjustable guide vane assembly. In particular, the ellipsoidal shape of the uptake space or of the guide vane head makes possible a relatively small radial thickness of the inner ring, which, for a small installation space or for a small housing, also makes possible an arrangement of a relatively large number of relatively long guide vanes at the inner ring.

Thus, it is also possible in a small compressor or in a small turbine to achieve an advantageous efficiency.

In addition, the essentially ellipsoidal and thus edgeless shape makes possible a simple insertion of the respective guide vane head into an uptake and thus enables damage to be prevented. An intermediate space between the guide vane head and a wall of the uptake (which may also be referred to as a "penny gap") can therefore be optimally designed as small, which minimizes the leakage in this region.

An inner ring according to the invention can be undivided or divided in the peripheral direction; in the latter case, it can thus be composed of two or more inner ring segments, for example, two ring halves, each with an axis angle (at the central axis) of 180°. For insertion of the guide vanes, they can be fastened radially outward at the housing. In this case, the inner ring segment can be equipped to be deformed and rolled onto the guide vane heads, so that, therefore, at least one portion of the guide vane heads can enter the respective uptakes in succession in the peripheral direction of the inner ring segment.

An inner ring segment according to the invention is equipped to be assembled with at least one other inner ring segment to form an inner ring according to the invention in accordance with an embodiment disclosed in this document. It comprises at least one uptake for the bearing of an adjustable guide vane. In one section, the uptake forms an essentially ellipsoidally shaped uptake space for a guide vane head of a guide vane. An inner ring segment according to the invention can be designed, for example, as a half ring, a one-third ring, or a quarter ring; that is, it can have an axis angle (at the central axis) of 180°, 120°, or 90°.

An inner ring according to the invention or an inner ring segment according to the invention can be axially divided or undivided.

Preferably, the section that forms the essentially ellipsoidally shaped uptake space of an inner ring or inner ring segment according to the invention comprises an uptake bottom surface (which is accordingly likewise essentially ellipsoidally shaped and, in particular, arched), which lies radially outward opposite to an opening (which faces or will face the housing) of the uptake. Analogously, the essentially ellipsoidally shaped guide vane head preferably has a surface region that lies opposite to the vane body, that is, in particular, is penetrated by the pivot axis and is arched.

In accordance with an advantageous embodiment of an inner ring according to the invention or of an inner ring segment according to the invention, the section of an uptake that forms the essentially ellipsoidally shaped uptake space (or at least a part of this section) is formed, in each case, essentially rotationally symmetric with respect to a provided pivot axis of a guide vane that is to be inserted. Correspondingly, the ellipsoidally formed guide vane head of a guide vane according to the invention is formed preferably rotationally symmetric with respect to a provided pivot axis of the guide vane. In this way, it is possible to create, optimally as small, an intermediate space between a wall of the uptake and a guide vane head that is accommodated or mounted in it, which minimizes any leakage in this region.

Accordingly, in these embodiments of the inner ring or guide vane, the associated ellipsoid is a rotational ellipsoid, for which the two half-axes of the same length L are each orthogonal to the provided pivot axis of the guide vane (which is to be inserted). The third half-axis, directed along the provided pivot axis, can likewise have the length L (so that the ellipsoid is therefore a sphere) or its length can be greater than the length L of each half-axis that is directed orthogonally to the provided pivot axis (which makes possible an especially secure bearing in the inner ring or an especially close arrangement of a plurality of guide vanes at the inner ring). Finally, the third half-axis can have a length that is less than the length L; it is thereby possible to create an inner ring of especially small radial thickness, which accordingly requires an especially small installation space.

In this case, the ellipsoidal uptake space or the guide vane head can comprise a full half-axis in the direction of the provided pivot axis (for example, it can be designed as a half-ellipsoid or even as a half-sphere) or it can have a height in the direction of the provided pivot axis that is less than the half-axis of the ellipsoid extending in this direction.

In accordance with an advantageous embodiment, an inner ring according to the invention or an inner ring segment according to the invention comprises, in a radially inner region, at least one sealing element, such as, for example, at least one run-in coating (for example, in the form of a honeycomb seal). The sealing element can be fastened in the radially inner region at the inner ring (or at an inner ring segment of the inner ring) or can be formed monolithically with it.

A contact surface provided in the uptakes of an inner ring according to the invention or of an inner ring segment according to the invention, which is equipped to contact an inserted guide vane head, can have, in full or in part, a coating for reducing frictional losses and/or wear. Analogously, at least a part of a surface of the guide vane head of a guide vane according to the invention can have a coating for reducing frictional losses and/or wear. In this case, the ellipsoidal shape makes possible an especially uniform and long-lasting coating.

In accordance with an advantageous embodiment of an inner ring according to the invention or of an inner ring segment according to the invention, the at least one of the uptakes forming an essentially ellipsoidal uptake space is equipped to be joined or to become joined with a correspondingly suitable guide vane head in a form-fitting manner, for example by means of a bayonet-type connection. For this purpose, it is possible to provide at least one groove in the uptake, for example, said groove having a section directed in a plane perpendicular to the pivot axis and being equipped for accommodating a radially acting securing element (for example, a securing pin or securing projection), which preferably protrudes from the correspondingly suitable guide vane head.

Analogously, a guide vane according to the invention can be equipped to be joined or will be joined with an inner ring in a corresponding uptake in a form-fitting manner, for example by means of a bayonet connection. For this purpose, the guide vane can comprise a radially acting securing element (for example, a securing pin or securing projection), which protrudes from its essentially ellipsoidally shaped guide vane head (preferably in a direction perpendicular to the pivot axis). The securing element can be formed monolithically with the guide vane head or can be joined as a separate part to the guide vane head, for example, in the form of a pin that is passed through the guide vane head. In this way, it is possible to ensure an especially firm connection of the inner ring and the guide vane.

An embodiment of an inner ring according to the invention or of an inner ring segment according to the invention is advantageous, in which a wall of the uptake that bounds the essentially ellipsoidally shaped uptake space adjoins, at least in one region, the radially outer inner ring surface. In a meridional section, which comprises the provided pivot axis, along the central axis of the inner ring, a transition from the inner ring surface to the wall can encompass an outer angle of 270° in this case. Alternatively, the wall can be inclined with respect to the inner ring surface, so that the mentioned outer angle preferably lies in a range from 225° to 265°, in particular from 230° to 255°. In this case, it can be especially effectively prevented that a renewed inflow of the leakage mass flow occurs perpendicular to the outer inner ring surface, the consequence of which would be a disruption of the main gas flow and thus would cause additional flow losses.

A guide vane assembly according to the invention comprises an inner ring and a plurality of adjustable (that is, pivotable) guide vanes. In this case, the inner ring is formed in accordance with an embodiment of an inner ring according to the invention disclosed in this document, and/or at least one of the guide vanes is formed in accordance with an embodiment of guide vane according to the invention disclosed in this document. The guide vane assembly can be provided for a compressor stage or for a turbine stage.

The guide vane head of the at least one guide vane can be mounted unsecured in the respective uptake, so that the guide vane is therefore fixed in place solely by the projection of its guide vane head into the uptake at the inner ring. Alternatively, the guide vane head can be retained by means of securing it at the inner ring, for example in that, as described above, it is joined in a form-fitting manner with the inner ring (wherein, for example, the uptake has a groove and the guide vane head has a projecting securing element, as stated above).

A turbomachine according to the invention comprises at least one compressor stage and/or turbine stage, which comprises at least one guide vane assembly according to the invention in accordance with an embodiment disclosed in this document. It can be, in particular, an aircraft engine.

BRIEF DESCRIPTION OF THE DRAWING FIGURES

Preferred exemplary embodiments of the invention will be described below in detail on the basis of drawings. It is understood that individual elements and components can also be combined in a different way than illustrated.

Figure 2:
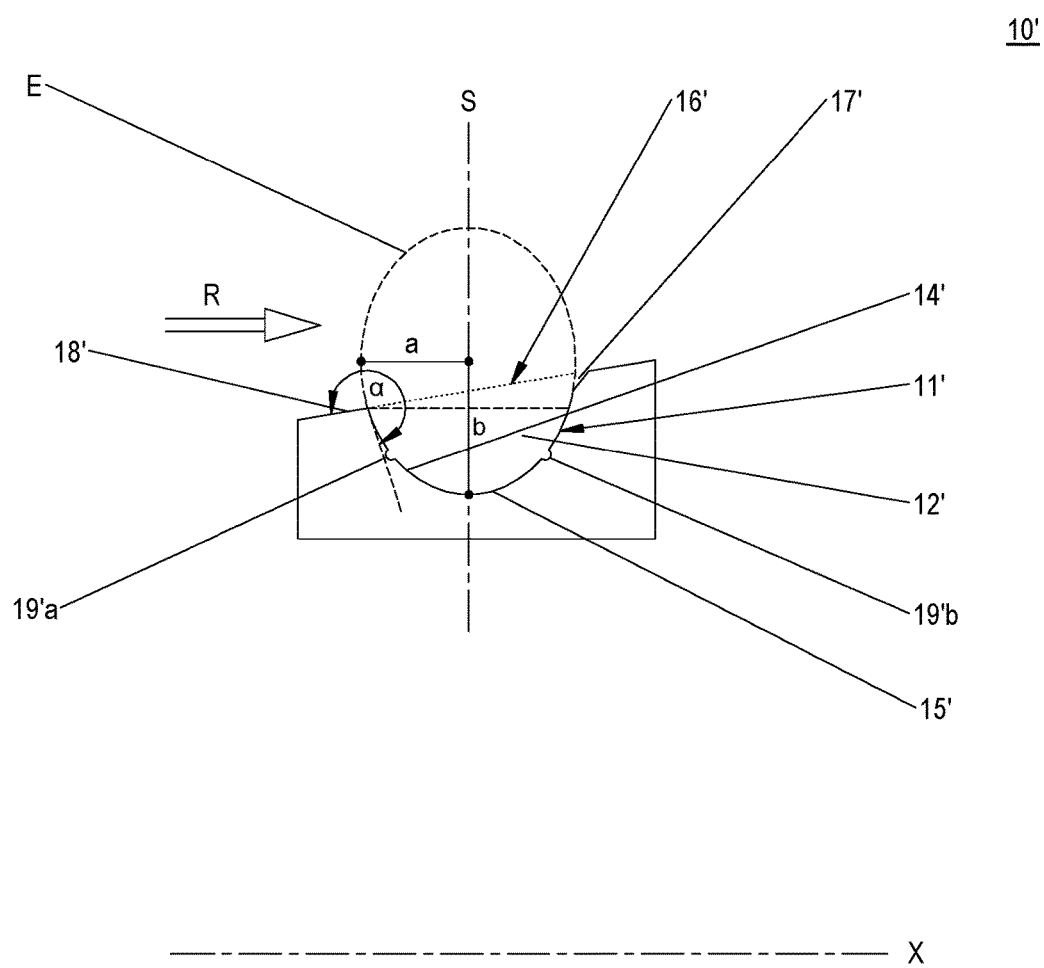
Figure 3A:
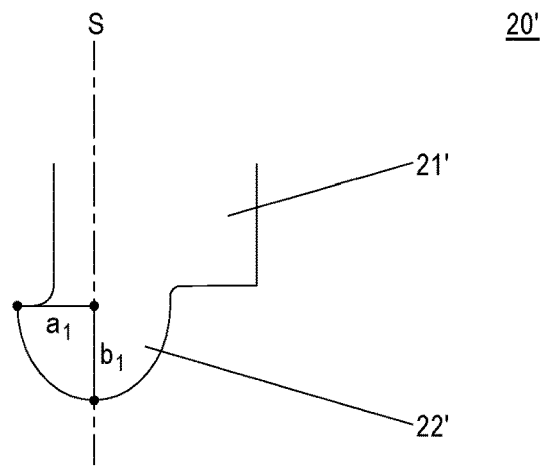
Figure 3B:
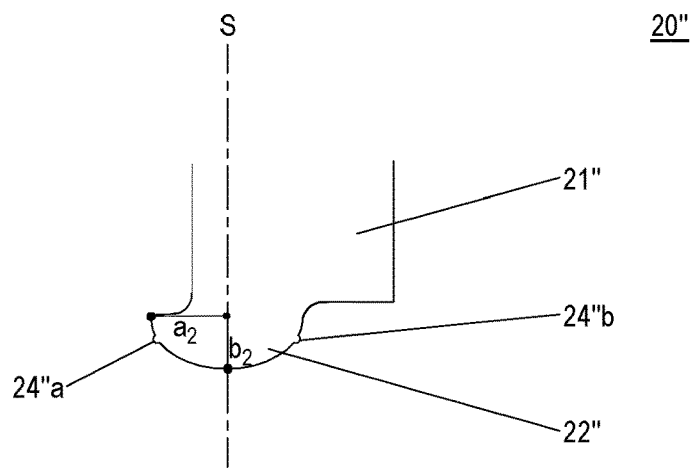
Figure 3C:
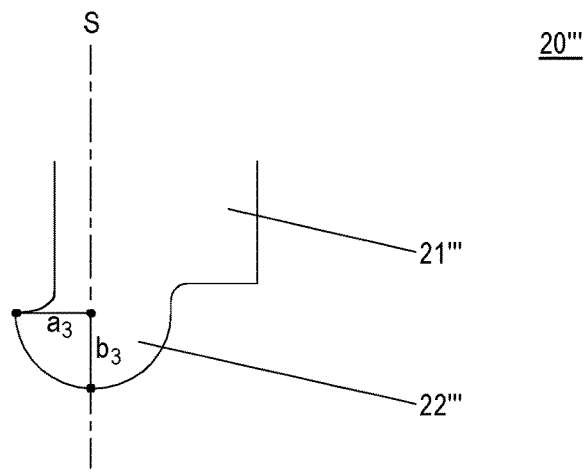

Shown schematically are:

FIG. 1: a section of an exemplary guide vane assembly according to the invention in a meridional section;

FIG. 2: an inner ring segment in accordance with an exemplary embodiment of the present invention in a meridional section;

FIG. 3a: a section of a guide vane in accordance with an embodiment of the present invention;

FIG. 3b: a section of a guide vane in accordance with another embodiment of the present invention; and FIG. 3c: a section of a guide vane in accordance with another embodiment of the present invention.

DESCRIPTION OF THE INVENTION

Illustrated in FIG. 1 is a section of an exemplary guide vane assembly 1 according to the invention in a meridional section along the central X axis of the guide vane assembly 1 (or of its inner ring 10). In this case, the meridional section runs additionally along the provided pivot axis S of a guide vane 20 of the guide vane assembly 1.

The illustrated guide vane 20 according to the invention comprises a vane body 21 and a guide vane head 22, which is an end of the guide vane 20 that is positioned radially inward (in relation to the central X axis of the guide vane assembly). The guide vane head 22 is ellipsoidal in shape and thus has a region 22a that coincides with the surface of an ellipsoid.

At a side facing away from the vane body, the guide vane head 22 projects over a leading edge 25 of the guide vane.

By means of an adjustable pin 24, which is equipped to be inserted into a housing (having an adjusting device not shown in FIG. 1), the guide vane 20 can pivot around a pivot axis S directed radially relative to the central X axis.

The illustrated inner ring 10 according to the invention (which can be composed of two or more inner ring segments) has a plurality of uptakes for respective guide vanes, of which only the uptake 11 can be seen in the sectional illustration. The uptake 11 hereby forms, in a radially inner section, an ellipsoidally shaped uptake space 12 for the guide vane head 22. In the example shown, besides the ellipsoidally shaped guide vane head 22, also a transition region 23 of the guide vane is accommodated in the uptake 11 of the inner ring 10.

An intermediate space 30 between the guide vane head and a wall of the uptake (which may also be referred to as a "penny gap") can be designed as optimally small on account of the bearing arrangement in accordance with the invention of the guide vane 20 together with its essentially ellipsoidally shaped guide vane head 22 in an uptake 11 with the correspondingly shaped uptake space 12. This bearing arrangement is, in addition, compact, robust, and low-wear.

Facing the central X axis, the inner ring inner ring 10 comprises a sealing element 13, which, in the example shown, is designed as a honeycomb seal and is monolithically molded on the inner ring 10.

Shown in FIG. 2 is an inner ring 10' segment according to the invention in a meridional section through an uptake 11' and along a central X axis of the inner ring segment 10' (or of an inner ring that forms the inner ring segment together with at least one other inner ring segment). The sectional plane in this case comprises the provided pivot axis S of a guide vane that is to be inserted into the uptake 11' (not illustrated).

The uptake 11' forms an essentially ellipsoidally shaped uptake space 12' for a guide vane head of the respective guide vane; the uptake space 12' is bounded by a part of the surface of an (abstract) ellipsoid E, along which a wall 14' of the uptake runs. The wall 14' comprises, in particular, a bottom surface 15' of the uptake, which lies radially opposite to an opening 16' of the uptake (which faces a guide vane to be inserted). Besides the essentially ellipsoidal uptake space 12', the uptake 11' comprises another region 17'.

The ellipsoid E has half-axes a and b, which are indicated in the figure, as well as another half-axis that is directed perpendicularly to the plane of the illustration. Preferably, this additional half-axis has the same length as the half-axis a, so that the ellipsoid E therefore is a rotational ellipsoid, the rotational axis of symmetry of which coincides with the pivot axis S.

Upstream of a provided main flow direction R, the wall 14' that bounds the essentially ellipsoidally shaped uptake space 12' adjoins the radially outer inner ring surface 18'. The wall 14' in this case is inclined with respect to the inner ring surface 18' by an outer angle α that is less than 270°. In this way, it can be prevented that a renewed inflow of the leakage mass flow occurs perpendicularly to the outer inner ring surface, which would result in a disruption of the main gas flow and thus additional flow losses.

The uptake 11' of the inner ring segment 10' further comprises two grooves 19'a, 19'b, which each run in a section in a plane perpendicular to the provided pivot axis S (not visible in the sectional illustration) and are each equipped to accommodate a securing projection at the guide vane head of a guide vane (not illustrated) that is to be inserted. For insertion, the two grooves each comprise a section leading to the opening 16'.

FIGS. 3a, 3b, and 3c each show a section of an adjustable guide vane 20', 20", and 20''' of different embodiments according to the invention in a sectional plane that comprises the provided pivot axis S. The guide vanes here each have a vane body 21', 21", or 21''' and an essentially ellipsoidally shaped guide vane head 22', 22", or 22'''. In these examples, the associated ellipsoid is a half-ellipsoid in each case.

Indicated in the figures are the half-axes $a_i$, $b_i$ (i=1, 2, 3) of the ellipsoids, which lie in the sectional plane and in accordance with which the guide vane heads are each formed. The half-axes $b_i$ (i=1, 2, 3) are each directed in the direction of the provided pivot axis S. A third (not visible) half-axis is directed orthogonally to the sectional plane. Its length preferably matches, in each case, the length of the corresponding half-axis $a_i$, so that, in each case, the ellipsoids are then rotationally symmetric with respect to the pivot axis S.

In the exemplary embodiment shown in FIG. 3a, the half-axis $b_1$ is longer than the half-axis $a_1$; the guide vane head is therefore equipped to be inserted into a relatively deep uptake of an inner ring (segment). In this way, the bearing arrangement is especially robust.

For the guide vane 20" shown in FIG. 3b, in contrast, the half-axis $b_2$ is shorter than the half-axis $a_2$. This permits a bearing arrangement in an inner ring that is especially thin (in the radial direction) and is especially easy to intermesh.

In the example shown, the guide vane head 22" has two (optionally present) securing elements 24"a, 24"b, which, in the present case, are formed as projections and project from the guide vane head. The securing elements 24"a, 24"b are each equipped for engaging in a suitable groove in an uptake of an inner ring and thus to secure the guide vane similarly to a bayonet connection at the inner ring.

The guide vane 20''', which is illustrated in FIG. 3c, has a guide vane head, for which the lengths of the half-axes $a_3$ and $b_3$ match. As long as the third axis (not visible) also has this length, the guide vane head is therefore formed as a half-sphere.

An inner ring 10 according to the invention or an inner ring segment 10' according to the invention for an adjustable guide vane assembly 1 comprises a plurality of uptakes 11, 11', each for bearing an adjustable guide vane 20, 20', 20", 20'''. The uptakes here each form an essentially ellipsoidally shaped uptake space 12 for a guide vane head 22, 22', 22", 22''' of the respective guide vane.

A guide vane 20, 20', 20", 20''' according to the invention for an adjustable guide vane assembly 1 has a vane body 21, 21', 21", 21''' and a guide vane head 22, 22', 22", 22'''. The guide vane head is essentially ellipsoidal in shape and is equipped to be pivotably accommodated in an uptake 11, 11' of an inner ring 10 or inner ring segment 10' of the guide vane assembly 1.

What is claimed is:

1. An inner ring for an adjustable guide vane assembly, comprising:
   an inner ring having a plurality of uptakes, each for the bearing of an adjustable guide vane, wherein the uptakes each create an essentially ellipsoidally shaped uptake space for a guide vane head of the respective guide vane.

2. The inner ring according to claim 1, wherein the essentially ellipsoidally shaped uptake space of the uptakes is configured and arranged, in each case, substantially rotationally symmetric with respect to a radially directed axis.

3. The inner ring according to claim 1, wherein the inner ring is divided in the axial direction and/or in the peripheral direction.

4. The inner ring according to claim 1, wherein at least one part of a contact surface of the inner ring, which is provided in the uptakes for contact with a guide vane head region of a guide vane, has a coating for reducing frictional losses and/or wear.

5. The inner ring according to claim 1, wherein an inner ring segment for the inner ring contains at least one of the uptakes, which forms an essentially ellipsoidally shaped uptake space for a guide vane head of a guide vane.

6. The inner ring according to claim 1, wherein an inner ring and a plurality of adjustable guide vanes are configured into a guide vane assembly.

7. The inner ring according to claim 6, wherein the guide vane assembly is configured and arranged in a turbomachine having at least one compressor stage and/or turbine stage.

8. A guide vane for an adjustable guide vane assembly, comprising:
   a vane body and a guide vane head, wherein the guide vane head is pivotably positioned in an uptake of an inner ring or inner ring segment of the guide vane assembly, and wherein the guide vane head is substantially ellipsoidal in shape.

9. The guide vane according to claim 8, wherein the ellipsoidally shaped guide vane head is configured and arranged rotationally symmetric with respect to a pivot axis of the guide vane.

10. The guide vane according to claim 8, wherein at least a part of a surface of the guide vane head has a coating for reducing frictional losses and/or wear.

11. The guide vane of claim 8 having an inner ring and a plurality of adjustable guide vanes.

* * * * *